US007690710B2

(12) United States Patent
Townson et al.

(10) Patent No.: US 7,690,710 B2
(45) Date of Patent: Apr. 6, 2010

(54) MOTOR VEHICLE ENDGATE HINGE HAVING DUAL PIVOT AXES

(75) Inventors: James M. Townson, Clarkston, MI (US); Leonard J. Brohl, Jr., Ortonville, MI (US); Michael K. Zelek, Canton, MI (US); Sarah Pearson, Novi, MI (US); Patrick O. McGee, Bloomfield Hills, MI (US); John B. Morley, Troy, MI (US); Tanya J. Klain, Novi, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/099,182

(22) Filed: Apr. 8, 2008

(65) Prior Publication Data

US 2009/0250959 A1 Oct. 8, 2009

(51) Int. Cl.
*B62D 33/03* (2006.01)

(52) U.S. Cl. .......................... 296/57.1; 296/51; 296/50

(58) Field of Classification Search ................ 296/57.1, 296/50, 1.01, 146.1, 146.11, 146.8, 51
See application file for complete search history.

(56) References Cited

U.S. PATENT DOCUMENTS

| | | | | |
|---|---|---|---|---|
| 3,387,406 | A * | 6/1968 | Coker et al. | 296/50 |
| 3,567,274 | A * | 3/1971 | Kaptur, Jr., et al. | 296/57.1 |
| 3,592,504 | A * | 7/1971 | Sandor | 296/70 |
| 3,623,764 | A * | 11/1971 | Jacobus | 296/50 |
| 4,076,301 | A * | 2/1978 | Gergoe | 296/50 |
| 6,676,196 | B1 * | 1/2004 | Smith | 296/146.8 |
| 7,080,868 | B2 * | 7/2006 | McClure et al. | 296/50 |
| 7,093,876 | B2 * | 8/2006 | Romig et al. | 296/50 |
| 7,147,257 | B2 * | 12/2006 | Johansen et al. | 292/341.15 |
| 7,150,486 | B2 * | 12/2006 | Ichinose | 296/51 |
| 7,165,800 | B2 * | 1/2007 | Thiele et al. | 296/50 |
| 7,201,422 | B2 * | 4/2007 | Plett et al. | 296/51 |
| 7,201,423 | B2 * | 4/2007 | Ichinose | 296/51 |
| 7,243,973 | B2 * | 7/2007 | Plett et al. | 296/57.1 |
| 7,258,373 | B2 * | 8/2007 | Plett et al. | 292/210 |
| 7,481,479 | B1 * | 1/2009 | Townson et al. | 296/51 |
| 7,556,303 | B2 * | 7/2009 | Waldner et al. | 296/51 |
| 2003/0122396 | A1 * | 7/2003 | Humphrey et al. | 296/51 |

* cited by examiner

*Primary Examiner*—Kiran B. Patel

(57) ABSTRACT

An assembly for opening and closing a passageway into the body of a motor vehicle includes a post secured to the body at a lateral side of the passageway, an endgate for opening and closing the passageway, and a hinge secured to the endgate and the post. The hinge defines a lateral axis and supports the endgate for pivoting about the lateral axis relative to the post, and the hinge defines an upright axis and supports the endgate for pivoting about the upright axis relative to the post.

4 Claims, 4 Drawing Sheets

MOTOR VEHICLE ENDGATE HINGE HAVING DUAL PIVOT AXES

BACKGROUND OF INVENTION

This invention relates generally to an endgate for a motor vehicle, and, more particularly, to an endgate and hinge assembly that allows the endgate to swing alternately about a lateral axis and an upright axis.

The tailgate at the back of a wagon, truck, or station wagon is usually hinged along a lateral axis at the bottom of the tailgate to pivot downward for convenience in loading or unloading cargo. A door at the back of a vehicle hinged along a lateral axis at the top of the door to open upward is often referred to as a hatch or lift gate.

In certain cases it is helpful and preferred that the vehicle has an endgate that can swing like a door about a vertical axis to facilitate access to the cargo area.

A more recent need exists in the automotive industry for a hinge assembly that supports an endgate such that the gate can swing both upward and downward about a horizontal axis and like a door about a vertical axis at the option of the user. It is preferable for such hinges to be substantially identical, easily installed, occupy a small space and available at low cost.

SUMMARY OF INVENTION

An assembly for opening and closing a passageway into the body of a motor vehicle includes a post secured to the body at a lateral side of the passageway, an endgate for opening and closing the passageway, and a hinge secured to the endgate and the post. The hinge defines a lateral axis and supports the endgate for pivoting about the lateral axis relative to the post. The hinge also defines an upright axis and supports the endgate for pivoting about the upright axis at the lateral side of the passageway.

The assembly provides dual axis hinging having minimum weight and low cost. For heavy load conditions that require endgate removal to avoid damage, the assembly enables the endgate to be removed from its assembled position on the vehicle with the use of simple tools.

The endgate with the hinge installed can be installed in the vehicle prior to paint shop operations and set dimensionally in the body shop of the assembly center, thereby avoiding the need to provide for additional corrosion protection.

DETAILED DESCRIPTION

Figure 1:
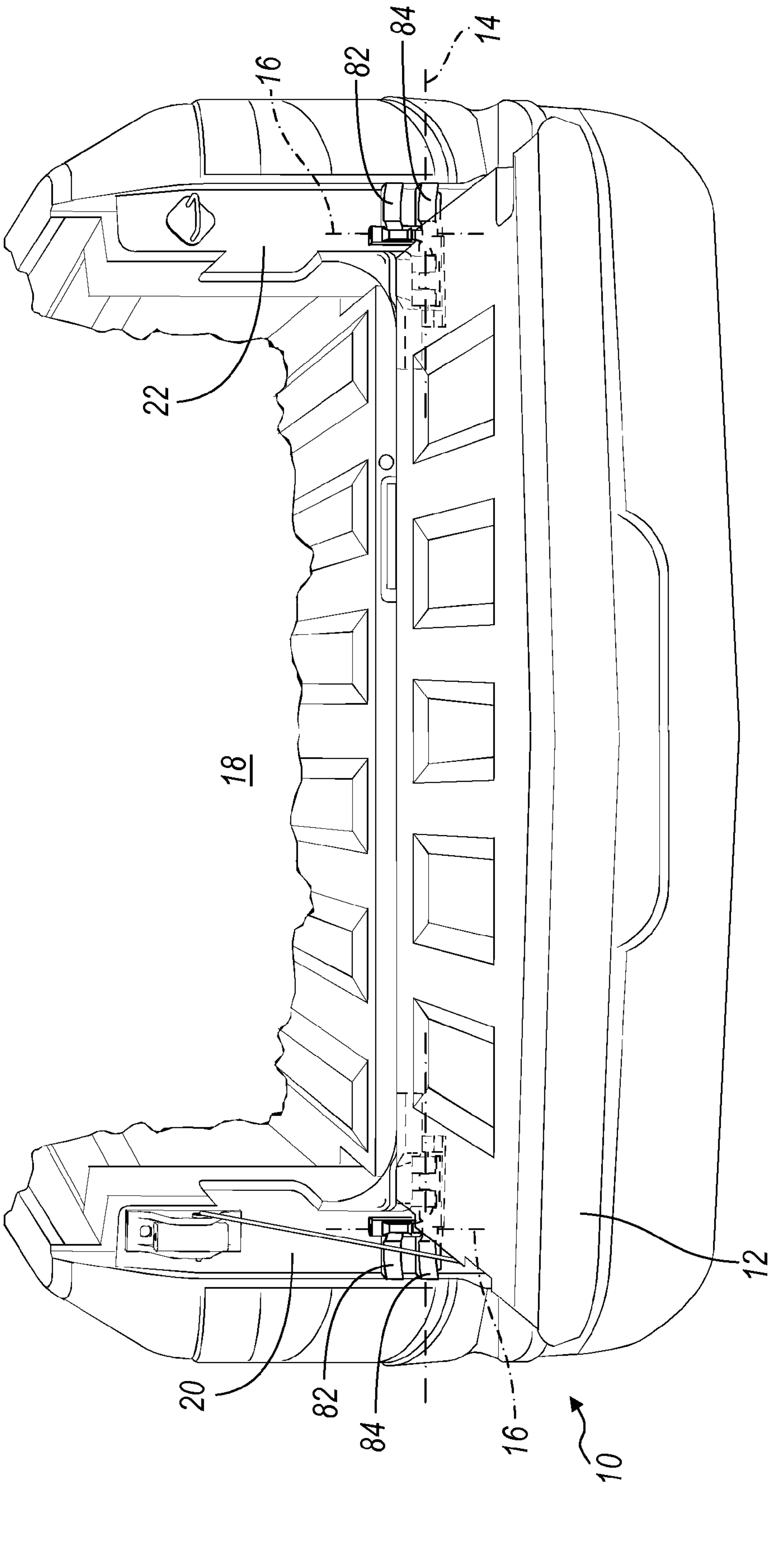
FIG. 1 is a rear view of a pickup truck showing the end gate opened about a lateral axis.
Figure 2:
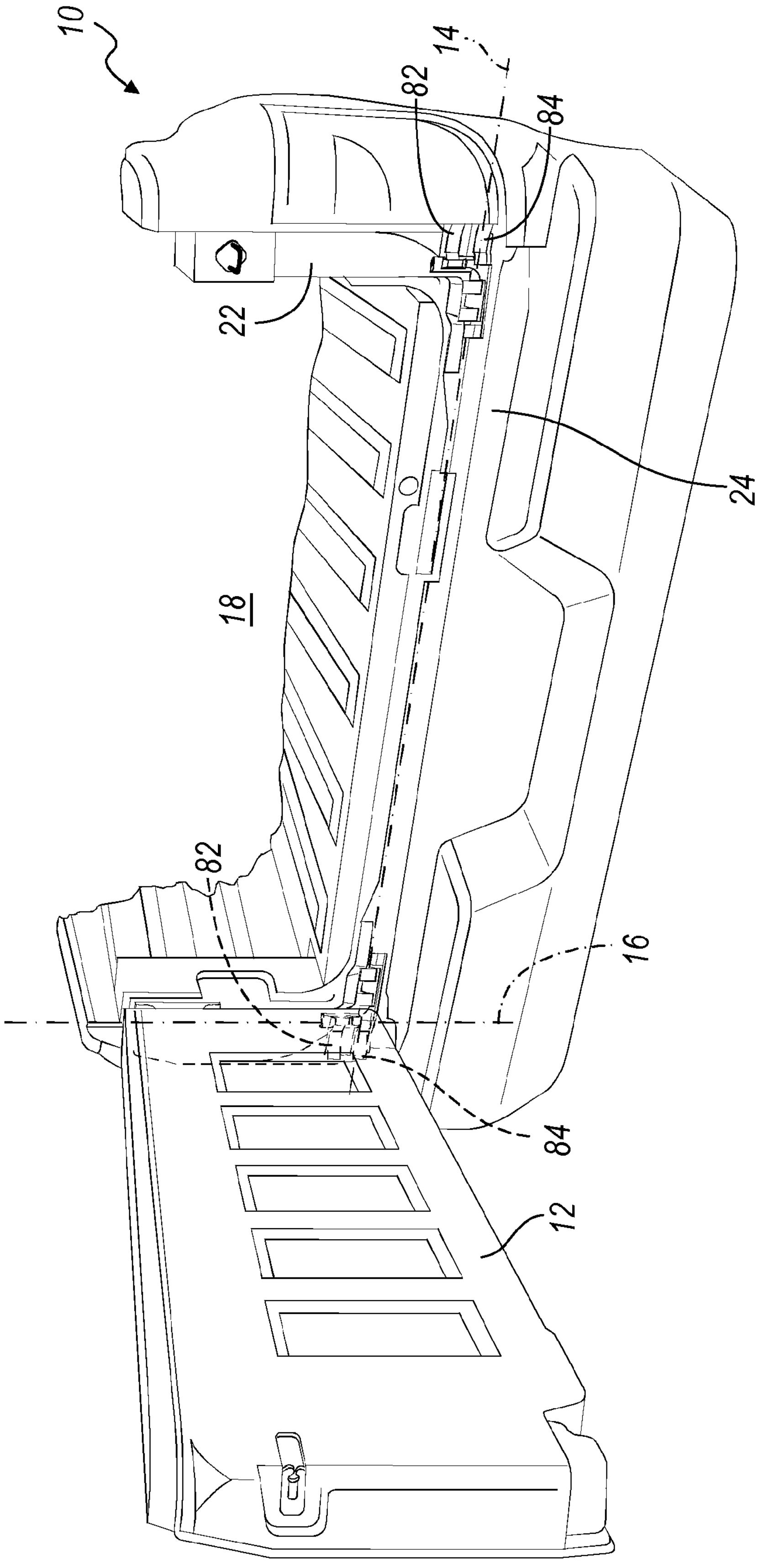
FIG. 2 is a rear view of the pickup truck showing the end gate opened about an upright axis.

Referring now to the drawings, there is illustrated in FIGS. 1 and 2 a pickup truck body 10 whose endgate assembly 12 is hinged both about a lateral axis 14 and an upright axis 16 for opening and closing access to the truck bed passageway 18. The cargo opening is formed with a left-side post 20, a right-side post 22, and a rail 24 interconnecting the posts 20, 22. Preferably, axis 14 is horizontal and axis 16 is vertical, although those axes may be skewed with respect to the horizontal and vertical planes. Axis 14 is located outboard of the endgate.

Figure 3:
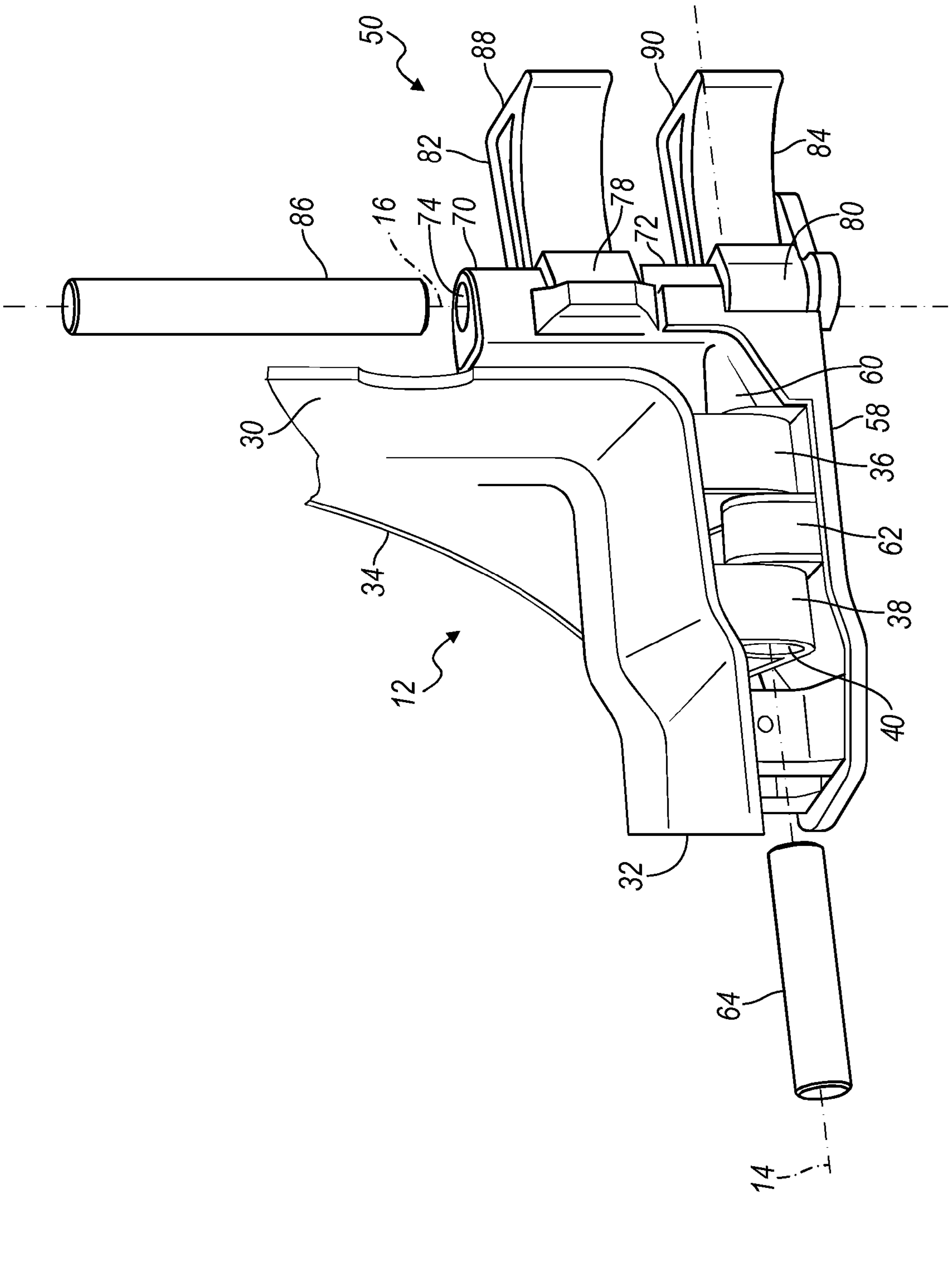
FIG. 3 is a perspective view of a portion of an endgate and a dual action hinge secured to the endgate.
Figure 4:
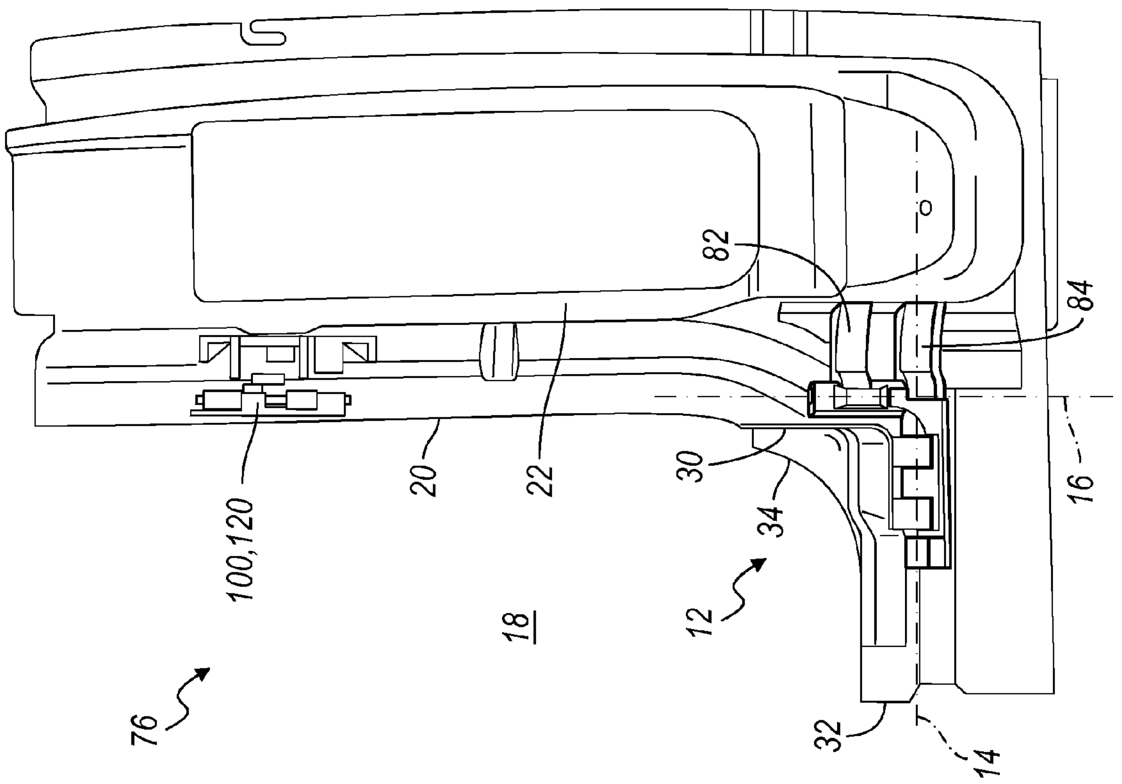
FIG. 4 is an end view looking forward and showing a right-side, rear post having the dual action hinge of FIG. 3 installed.

As shown in FIGS. 3 and 4, the endgate 12 is formed with a side leg 30, a lateral leg 32 and an end panel 34 secured to the legs 30, 32. The lower surface of the lower leg 32 is secured to two mutually spaced first lugs 36, 38, each lug being formed with a laterally-directed circular cylindrical first hole 40, with each hole being aligned mutually and installed in the vehicle in alignment with lateral axis 14. The lugs 36, 38 may be formed integrally with the lower leg 32 or connected to the lower leg 32 by mechanical fasteners, welding or bonding.

An endgate dual-axis hinge 50 includes a lower plate 58, which extends laterally and is formed with two mutually spaced fourth lugs 60, 62, each lug being formed with a laterally-directed circular cylindrical hole. The holes in lugs 60, 62 of endgate dual-axis hinge 50 are aligned mutually and aligned with the holes 40 in lugs 36, 38 of the endgate 12. A second hinge pin 64 is installed in the holes of the endgate lugs 36, 38 and the holes of the endgate hinge lugs 60, 62. The endgate dual-axis hinge 50 is installed in the vehicle 10 such that the aligned holes of lugs 36, 38, 60, 62 are aligned also with lateral axis 14.

First lugs 36, 38 and the endgate 12 can pivot about lateral axis 14 relative to the post 22.

The endgate dual-axis hinge 50 is formed with two mutually spaced second lugs 70, 72, each lug being formed with a laterally-directed circular cylindrical second hole 74 and secured to lower plate 58. The holes in lugs 70, 72 are aligned mutually and are aligned with holes in third lugs 78, 80, which are formed in upper and lower arms 82, 84, respectively. A first hinge pin 86 is installed in the holes of lugs 70, 72, 78, 80. The endgate dual-axis hinge 50 is installed in the vehicle 10 such that the aligned holes of lugs 70, 72, 78, 80 are aligned with upright axis 16.

The outer end 88 of first arm 82 and the outer end 90 of second arm 84 are secured to the laterally facing surface of the right-side post 22, preferably by mechanical fasteners. Lugs 70, 72, lower plate 58, lugs 60, 62 of dual-axis hinge 50, and lugs 36, 38 of the endgate 12 can pivot about axis 16 relative to the arms 82, 84 and post 22.

In operation, when a rearward force is applied to endgate 12, the endgate swings about lateral axis 14 to the open position shown in FIG. 1 due to its being supported on post 22 by a dual action endgate hinge 50 secured to post 22 and a dual action endgate secured to post 20. Endgate 12 swings also about axis 16 to the open position as the dual action endgate hinge 50 pivots about pin 86 and a hinge pin aligned with pin 86 located on a support 100 or 120 secured to post 22 and located at a higher elevation than that of endgate hinge 50. Arms 82, 84 are formed to provide clearance with the endgate 12 as it pivots about the upright axis 16. Therefore, the endgate 12 can pivot through an angle of 90 degrees from the closed position to the open position.

Although the term "endgate" has been used in this description, the invention is applicable also to a tailgate hinged at the top to open downward, to a lift gate or hatch hinged at the top to open upward, and to a door hinged at the side for convenience in loading or unloading cargo.

While certain embodiments of the present invention have been described in detail, those familiar with the art to which this invention relates will recognize various alternative designs and embodiments for practicing the invention as defined by the following claims.

What is claimed is:

1. An assembly for opening and closing a passageway into the body of a motor vehicle comprising:

a post secured to the body at a lateral side of the passageway;

an endgate for opening and closing the passageway;

an arm secured to a laterally facing surface of the post; and a dual-axis hinge secured to the endgate and the arm defining a lateral axis and supporting the endgate for pivoting about the lateral axis relative to the post, the dual-axis hinge and the arm defining an upright axis and supporting the endgate for pivoting about the upright axis relative to the post.

2. The assembly of claim 1, wherein the lateral axis is located in a horizontal plane, and the upright axis is located in a vertical plane.

3. The assembly of claim 1, further comprising:

a first lug secured to the endgate and formed with a first hole aligned with the lateral axis;

a second lug secured to the dual-axis hinge and formed with a second hole aligned with the upright axis;

the arm formed with a third lug;

a first hinge pin located in the second hole and the third lug;

the dual-axis hinge further includes a fourth lug; and a second hinge pin located in the first hole and the lug.

4. The assembly of claim 1, further comprising:

first lugs, each first lug secured to the endgate and formed with a first hole aligned with the lateral axis;

second lugs, each second lug secured to the dual-axis hinge and formed with a second hole aligned with the upright axis;

a second arm secured to said surface, the arm and the second arm each formed with a third lug;

a first hinge pin located in the second holes and the third lugs;

the dual-axis hinge further includes fourth lugs; and a second hinge pin located in the first holes and the fourth lugs.

* * * * *